Figure 1:
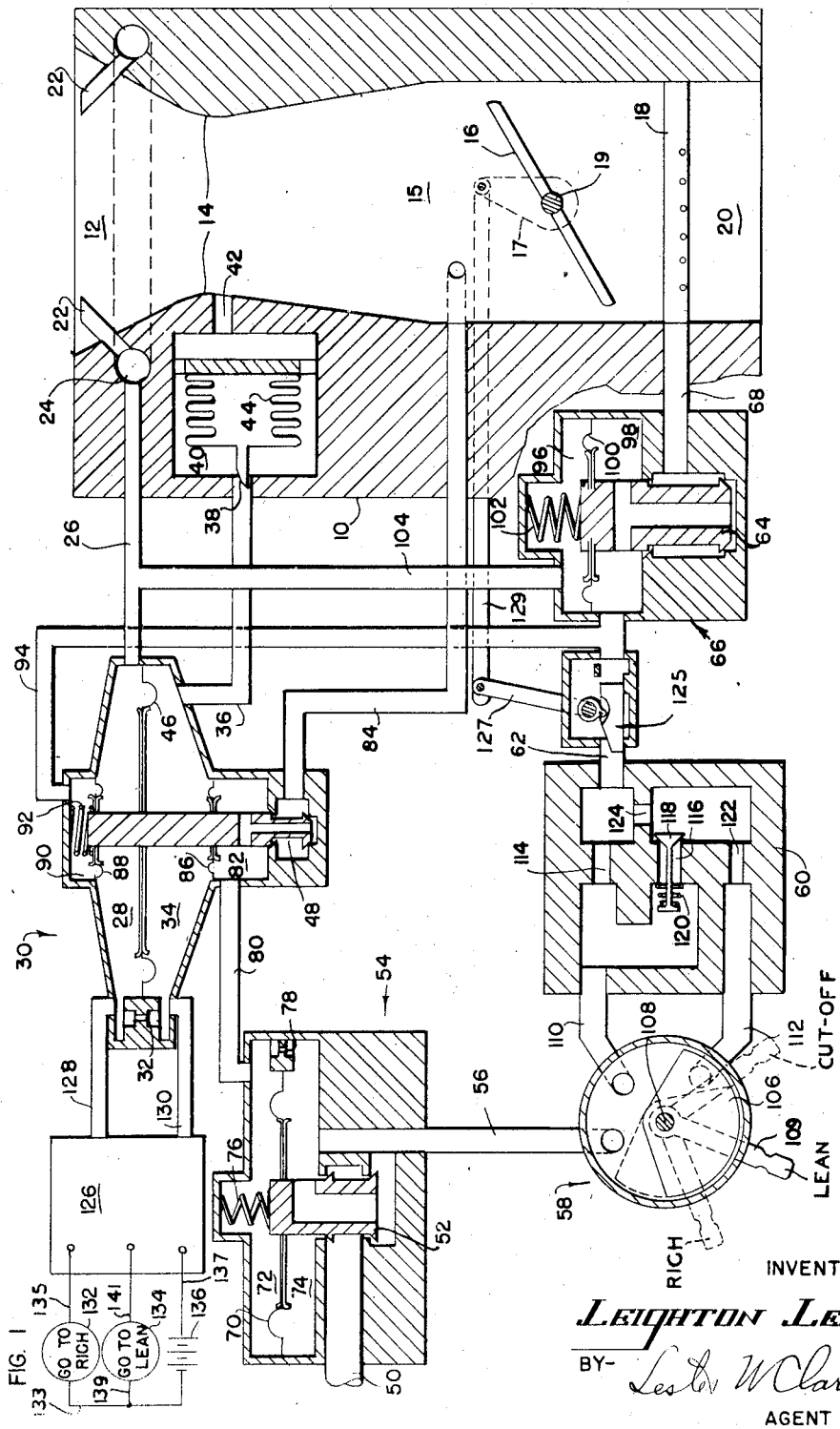

INVENTOR
LEIGHTON LEE II
BY- Lester W Clark
AGENT

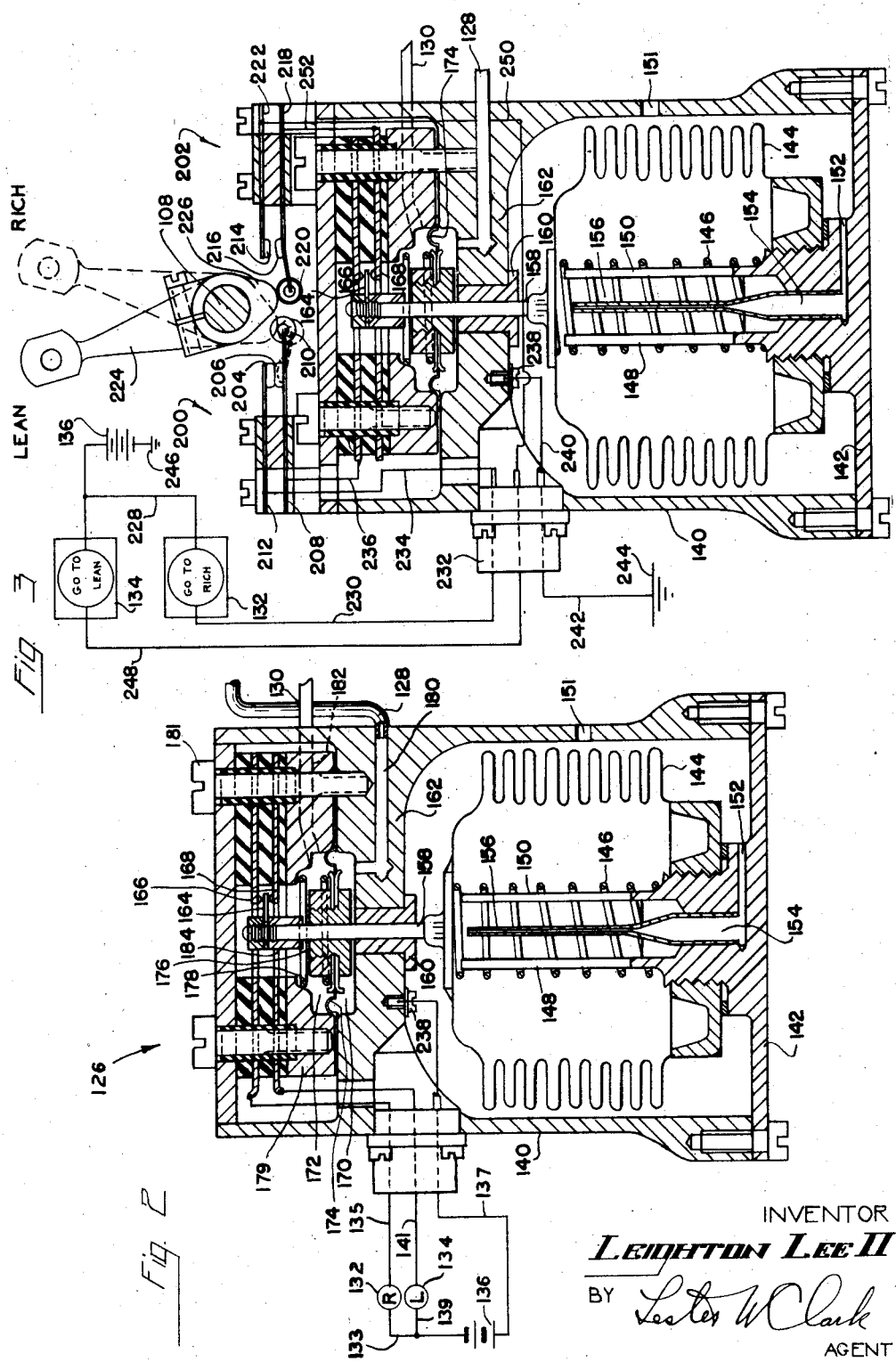

Oct. 21, 1947.    L. LEE, 2D    2,429,322
SIGNAL OR CONTROL APPARATUS
Filed May 4, 1944    4 Sheets-Sheet 3
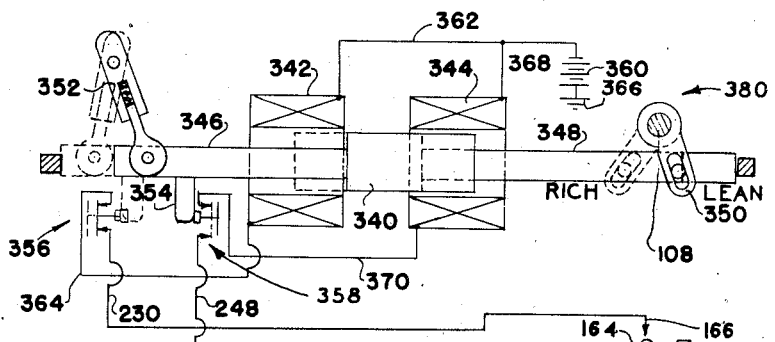
FIG. 6
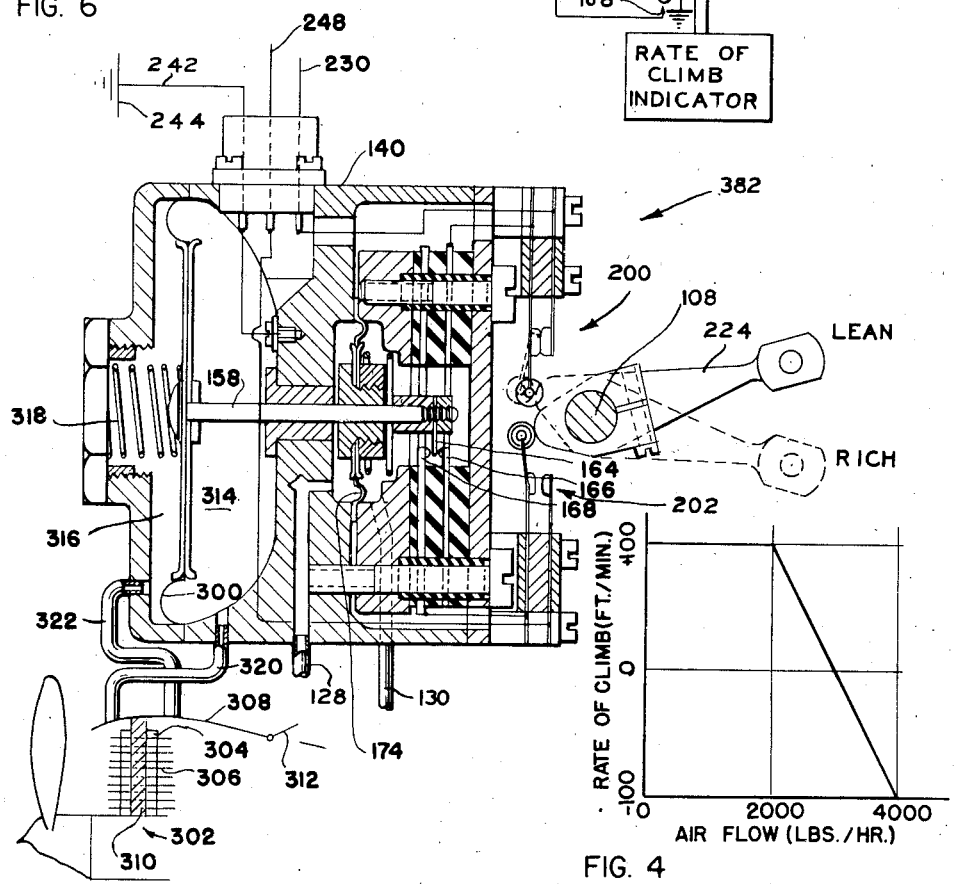
FIG. 5
FIG. 4
INVENTOR
*Leighton Lee II*
BY- *Lester W Clark*
AGENT INVENTOR.
Leighton Lee II Patented Oct. 21, 1947

2,429,322

UNITED STATES PATENT OFFICE 2,429,322

SIGNAL OR CONTROL APPARATUS

Leighton Lee, II, Middletown, Conn., assignor, by mesne assignments, to Niles-Bement-Pond Company, West Hartford, Conn., a corporation of New Jersey Application May 4, 1944, Serial No. 534,042

13 Claims. (Cl. 123—119)

The present invention relates to signal or control apparatus, and especially to apparatus either for indicating to a member of the crew of an aircraft a need for a change in, or for controlling directly, the ratio of fuel to air supplied to an internal combustion engine used for driving said aircraft.

Internal combustion engines of the type commonly used on aircraft run cooler with a relatively rich mixture. It is therefore desirable when operating the engine under high power output conditions to use a rich mixture. On the other hand, it is desirable when operating at cruising speeds in level flight to use a lean mixture in order to secure better economy of operation.

An object of the present invention is therefore to provide improved means responsive to the rate of climb of an aircraft and to the quantity of combustion air flowing to an internal combustion engine of the aircraft for indicating to a member of the aircraft crew the proper fuel to air ratio to be used.

Another object of the present invention is to provide improved signal apparatus of the type disclosed in the co-pending application of Milton E. Chandler, Serial No. 498,138, filed August 11, 1943, now U. S. Patent No. 2,407,134, issued September 3, 1946.

A further object is to provide improved signal means responsive to the rate of climb of an aircraft for indicating to the pilot that a rich fuel to air ratio should be used whenever the rate of climb exceeds a predetermined value and for indicating that a lean fuel to air ratio should be used whenever the rate of climb is less than a different predetermined value.

Another object is to provide means responsive to the quantity of combustion air entering the engine per unit time and cooperating with the rate of climb responsive means for indicating to the pilot that a rich fuel to air ratio should be used whenever that quantity of combustion air exceeds a predetermined value.

A further object is to provide means responsive to the resultant of a first force varying in accordance with the rate of climb of an aircraft and a second force varying in accordance with the rate of flow of air to an internal combustion engine of said aircraft for operating a signal to indicate the proper fuel-to-air ratio.

A still further object is to provide an arrangement of the type described in which the first force operates the signal regardless of the second force whenever the first force exceeds a predetermined value.

Another object of this invention is to provide improved means responsive to a condition indicative of the temperature of the engine for controlling, or indicating the need for a change in, the ratio of fuel to air supplied to the engine.

Another object is to provide means responsive to the flow of cooling fluid in the engine cooling system for controlling, or indicating the need for a change in, the ratio of fuel to air supplied to the engine.

A further object is to provide, in an air-cooled engine, means responsive to the pressure drop thru the engine cooling system for controlling, or indicating the need for a change in, the ratio of fuel to air supplied to the engine.

Other objects and advantages of the present invention will become apparent from a consideration of the appended specification, claims and drawings, in which Figure 1 is a somewhat diagrammatic illustration of a carburetor for an internal combustion engine, provided with signal apparatus in accordance with the principles of my invention, Figure 2 is a cross-sectional view of a signal or control switch operating mechanism shown diagrammatically in Figure 1, Figure 3 is a cross-sectional view of a modified form of the switch operating mechanism of Figure 2.

Figure 7:
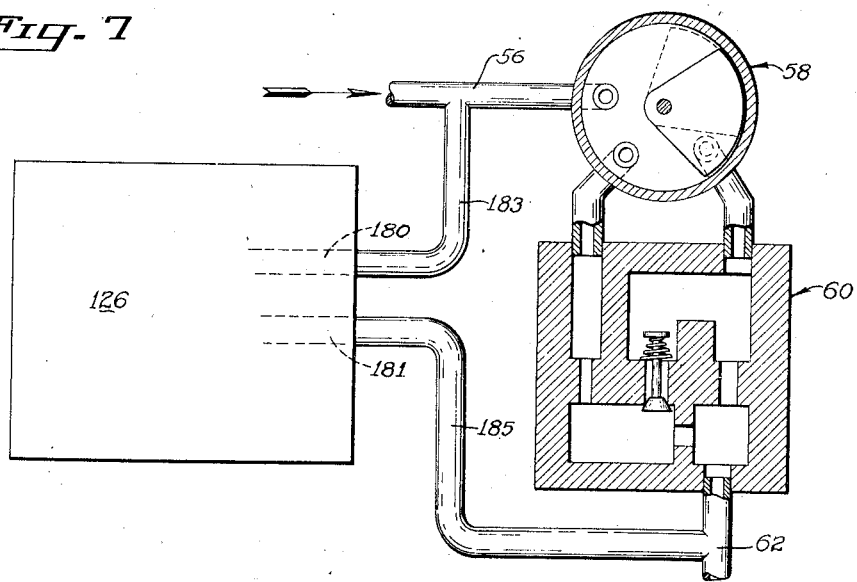
Figure 8:
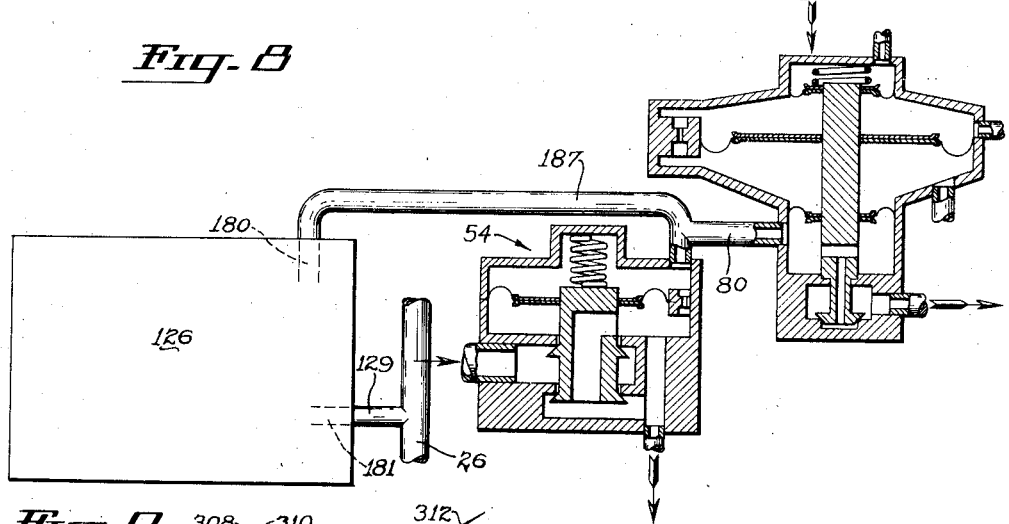
Figure 9:
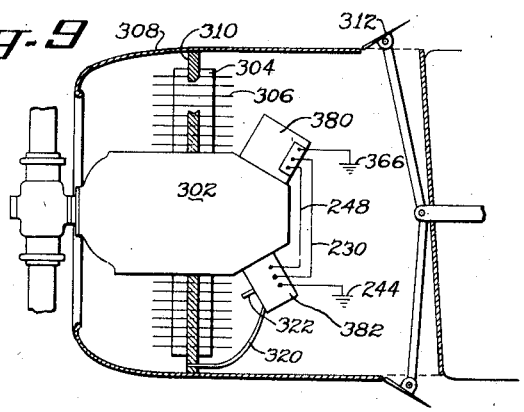

Figure 4 is a graphical illustration of the operation of the device shown in Figures 2 and 3, Figure 5 is a partially diagrammatic, partially cross-sectional view of a modified form of the switch operating apparatus of my invention, Figure 6 is a diagrammatic illustration of control apparatus which may be used in place of the signal apparatus of Figure 1, Figures 7 and 8 illustrate modified systems for supplying control pressures to the device of Figure 2, and Figure 9 illustrates, somewhat diagrammatically, a method of mounting the devices of Figures 5 and 6 on an engine and connecting the same.

Figure 1

Maximum fuel economy is obtained in an internal combustion engine when the mass of air supplied in a given period of time is just sufficient to completely burn the mass of fuel supplied in the same period of time. If the mixture is proportioned for maximum economy, it burns rather quickly and at a high temperature. If the mixture is enriched somewhat by the addition of more fuel, it burns more slowly and at a lower temperature. When the engine is running under light loads, it is permissible and even desirable to regulate the mixture for maximum economy. When the engine is running under heavy loads, overheating and detonation conditions are produced if the mixture is controlled for maximum economy. Therefore, it is desirable to provide apparatus for increasing the richness of the mixture when the engine load conditions are such that the lean mixture is unsuitable. Alternatively, instead of increasing the richness of the mixture automatically, the apparatus may be utilized to operate a signal to inform a member of the aircraft crew, who may then use his own judgment as to whether the fuel-to-air ratio should be increased.

In order to proportion the mass of fuel flowing per unit time to the mass of air flowing, the mass of air must first be measured, and the fuel flow controlled in accordance with that measurement.

Referring to the drawing, there is shown a body 10 of a carburetor for an internal combustion engine of an aircraft. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the venturi is constant, this pressure differential may be taken as a measure of the volume of air flowing thru the passage per unit time.

In order to obtain a pressure differential varying as a function of the mass of air per unit time flowing thru the venturi 14, the pressure differential between entrance 12 and the throat of venturi 14 is utilized to create an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12, thru tubes 22, a passage 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, and thence thru a conduit 42 to the throat of venturi 14.

The valve 38 is operated by a sealed bellows 44 mounted in the chamber 40. The bellows 44 is fixed at one end, so that the position of the free end, to which valve 38 is attached, varies in accordance with the air pressure in the chamber 40. The bellows 44 is preferably filled with nitrogen or some other suitable temperature responsive fluid, so that the position of valve 38 varies not only with the pressure but with the temperature of the air in the chamber 40, and hence with the density of that air.

In the secondary air passage, the pressure differential between the entrance 12 and the throat of venturi 14 is divided into two component pressure drops, one across the restriction 32 and the other across the valve 38. The valve 38 is positioned in accordance with the density of the air flowing thru the passage 15. Valve 38 is moved toward open position as the air density increases and toward closed position as the air density decreases. If the volume of air flowing per unit time thru passage 15 remains constant while its density decreases, then the mass of air is decreased, but the pressure differential set up by the venturi 14 remains constant. However, the movement of valve 38 toward closed position causes the component pressure drop across valve 38 to increase, and the component pressure drop across restriction 32 to decrease, reflecting the decrease in the mass of air flowing. By proper design of valve 38, the pressure drop across restriction 32 may be made to vary substantially in accordance with the mass of air flowing thru passage 15. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. It flows thru a conduit 50, a valve 52 in a pressure regulator generally indicated at 54, a conduit 56, a mixture control generally indicated at 58, a jet system 60, an idle valve 125, a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to the main air passage 15.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54. The position of diaphragm 70 and valve 52 is determined by the balance between the spring 76 plus the pressure in chamber 72 acting in a valve opening direction and the pressure in chamber 74 acting in a valve closing direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60. For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due to operation of the throttle or to variations in engine speed, from reaching the downstream side of the jet system and affecting the fuel flow.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the passage 24 and impact tubes 22 to the air entrance 12. The chamber 98 is connected to the conduit 62.

The mixture control 58 includes a disc valve 106 fixed on a shaft 108 rotatable by a manually operable lever 109. The disc valve 106 controls the flow of fuel thru ports opening into conduits 110 and 112 which lead into the jet system 60. When the disc 108 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by a valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel to air ratio under heavy load conditions.

At low air flows, such as are encountered under idling conditions, the pressure differential set up by the venturi 14 tends to be erratic, and is not a reliable indication of the volume of air entering the engine. Provision is made to control the fuel flow directly in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. A closing movement of valve 48 causes an increase in the fuel flow thru the main fuel line, since the closure of valve 48 increases the pressure in chamber 82 of pressure meter 30 and hence in chamber 72 of pressure regulator 54. Furthermore, the spring 76 of pressure regulator 54 biases valve 52 in an opening or fuel flow increasing direction.

An idle valve 125 is provided, and connected to the throttle by a lever 127, a link 129, and an arm 17 attached to the shaft 19 on which the throttle 16 is fixed. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore the fuel flow under idling conditions is then controlled principally by the valve 125 in accordance with the position of the throttle. The air pressure differential acting on diaphragm 46 is at such times small as compared to the force of spring 92. The pressure meter 30 then controls the pressure regulator 54 to maintain a fuel pressure differential across the jet system and the idle valve in series which is substantially constant, since it balances the constant force of spring 92. The fuel flow produced by this constant pressure differential is determined by the opening of valve 125.

A switching mechanism generally indicated at 126 responds to the pressure differential across restriction 32 in pressure meter 30. For this purpose, the switching mechanism 126 is connected by conduits 128 and 130 respectively to chambers 28 and 34 in the pressure meter. The switching mechanism 126 controls electrical circuits for selectively energizing a pair of signals 132 and 134, which respectively indicate "go to rich" and "go to lean." These signals may be energized from a suitable source of electrical energy such as a battery 136.

*Figure 2*

There is shown in Figure 2 a switch mechanism such as that schematically indicated at 126 in Figure 1.

Referring now to Figure 2, there is shown a generally cylindrical casing 140 suitably attached to a base 142. Inside the casing there is mounted on the base 142 a bellows 144. A spring 146 is compressed between the bellows 144 and the base 142. A pair of guide members 148 and 150 project from the base 142 and maintain the spring 146 in proper alignment. The exterior of bellows 144 is exposed to atmospheric pressure thru a suitable opening 151 in the casing 140. A passage 152 extends horizontally from the space adjacent the exterior of bellows 144 to a vertical passage 154 which extends upwardly thru the base 142 and is concentric with bellows 144. An elongated nozzle 156 connects the passage 152 with the interior of bellows 144. The passage thru nozzle 156 is of a very small cross-section, and restricts the flow of air between the exterior and interior of bellows 144.

As long as the aircraft is operated at a constant altitude, the pressures inside and outside the bellows 144 are equal. As the aircraft changes its altitude, as by climbing for example, the pressure outside the bellows decreases due to the increase in altitude. This change in pressure is not immediately communicated to the interior of bellows 144 because of the restriction in nozzle 156. Therefore, the bellows 144 tends to expand. The force acting to expand the bellows is proportional to the rate of change of the altitude of the aircraft, and the free end of the bellows 144 is therefore positioned in accordance with the rate of change of the altitude of the aircraft.

There is mounted on the upper or free end of the bellows 144 a rod 158. The rod 158 extends thru a bushing 160 mounted in a transverse wall 162 of the housing 140. There is mounted on the upper end of rod 158 a movable switch contact 164, which cooperates with a pair of stationary contacts 166 and 168.

Above the wall 162, the interior of the casing 140 is hollow and is divided into two expansible chambers 170 and 172 by a flexible diaphragm 174. The diaphragm 174 carries at its center a collar 176 thru which the rod 158 passes. A spring 178 is held in compression between the diaphragm 174 and an internal shoulder on a casing 179 fastened by any suitable means, such as bolt 181 of Figure 2, to the housing 140. The spring 178 biases the diaphragm 174 downwardly.

The chamber 170 under the diaphragm 174 is connected thru a passage 180 to the conduit 128 of Figure 1. The chamber 172 above the diaphragm 174 is connected thru a passage 182 to the conduit 130 of Figure 1. Therefore, as explained in connection with Figure 1, a pressure differential exists between chambers 170 and 172 which is proportional to the mass of air entering the carburetor per unit time.

Although I have illustrated an air pressure differential acting on the diaphragm 174, it should be apparent that, since the fuel pressure differential across the jet system 60 is proportional to the air flow, that fuel pressure differential could be used to operate the diaphragm 174. Such an arrangement is shown in Figure 7 where the passage 180 in the switch mechanism 126 is connected thru a conduit 183 to the fuel conduit 56 upstream from the jet system, and the passage 181 is connected thru a conduit 185 to the fuel conduit 62 downstream from the jet system. In a similar manner, the pressure in the conduit 80 could be used on the lower side of the diaphragm 174, with the upper chamber 172 connected to the atmosphere or any other source of substantially constant pressure. Such an arrangement is shown in Figure 8 wherein the passage 180 of switch mechanism 126 is connected thru a conduit 187 to the conduit 80 which runs between the pressure regulator 54 and the pressure meter 30. The passage 181 of the switch mechanism is connected thru a conduit 129 to the conduit 26 leading to the air inlet of the carburetor. The pressure in conduit 80 varies in proportion to the rate of flow of air entering the carburetor, inasmuch as it is controlled by valve 48.

The rod 158 slides freely thru the collar 176. A spacer 184 is fixed on the rod 158 just under the contact 164. The lower surface of spacer 184 cooperates with the upper surface of bushing 176. The spring 178 is chosen so that these surfaces are in engagement whenever the bellows 144 is in its normal (zero rate of change of altitude) position and the mass of air entering the carburetor per unit time exceeds a predetermined value. When these surfaces are in engagement, the contact 164 is positioned in accordance with the sum of two forces, one whose magnitude indicates the rate of change of altitude of the aircraft, and another whose magnitude indicates the rate of flow of air entering the engine, and hence the power produced by the engine. Both of these forces act upwardly when the conditions to which they respond change in a direction indicative of the need for a richer fuel and air mixture, and downwardly when the conditions indicate the need for a leaner fuel and air mixture.

When the contact 164 engages contact 166, a circuit is completed for the "go to rich" signal 132. This circuit may be traced from the upper terminal of battery 136 and thru a conductor 133, signal 132, a conductor 135, contact 166, contact 164, binding post 238, and a conductor 137 to the lower terminal of battery 136. Similarly, when contact 164 engages contact 168, a circuit is completed for the "go to lean" signal 134. This circuit may be traced from the upper terminal of battery 136 thru a conductor 139, signal 134, a conductor 141, switch contact 168, contact 164, rod 158, bushing 160, casting 162, binding post 238 and conductor 137 to the lower terminal of battery 136.

When the rate of flow of air to the engine is so small that diaphragm 174 does not compress spring 178 and move sleeve 176 into engagement with spacer 184, then the movable switch contact 164 is positioned solely in accordance with the rate of climb, as measured by the bellows 144. As soon as the combustion air flow to the engine increases to a point where sleeve 176 engages spacer 184, then the contact 164 is positioned in accordance with the resultant of two forces, one of which is a measure of the rate of climb of the aircraft and the other of which is a measure of the rate of flow of combustion air to the engine.

*Figure 3*

There is illustrated in Figure 3 a modification of the switch mechanism illustrated in Figure 2 in which additional switches are provided, operated by the mixture control shaft 108, to cut off the signals when the mixture control is in the proper position.

Those elements of Figure 3 which correspond to equivalent elements of Figure 2 have been given the same reference characters.

Mounted on the top of the casing 140 of Figure 3 are a pair of switches generally indicated at 200 and 202. The switch 200 includes a stationary contact 204 and a movable contact 206. The movable contact 206 is carried by a leaf spring 208 which extends inwardly from the outer edge of casing 140. The inner end of leaf spring 208 carries a roller 210 having a surface of electrically insulating material. Stationary contact 204 is carried by another leaf spring 212 which extends substantially parallel to spring 208.

Similarly, the switch 202 includes a stationary contact 214 and a movable contact 216. The movable contact 216 is mounted on a leaf spring 218 which extends inwardly from the outer edge of the casing 140 opposite the switch 200 and carries at its inner end a roller 220 having a surface of electrically insulating material. Stationary contact 214 is carried by a leaf spring 222 which extends parallel to spring 218.

The mixture control shaft 108 is positioned above the rollers 210 and 220, and carries a mixture control lever 224 having a downwardly extending cam portion 226 adapted to engage the rollers 210 and 220, depending upon the angular position of the lever 224.

The leaf springs 208 and 218 are self-biased so that the contacts 206 and 216 tend to engage the stationary contacts 204 and 214, respectively. The mixture control lever 224 is shown in full lines in its lean position, wherein the contact 216 is separated from contact 214. When the mixture control lever 224 is in its rich position, shown in dotted lines in the drawing, the contact 206 is separated from contact 204.

*Operation of Figure 3*

When the mixture control lever 224 is in the position shown in full lines in the drawing, the carburetor supplies the engine with a lean mixture. If the flight conditions then change so that contact 164 is moved upwardly into engagement with contact 166, an energizing circuit is completed for signal 132, which is schematically illustrated as an illuminated signal bearing a suitable legend indicating that the mixture control lever 224 should be moved to its rich position. This energizing circuit may be traced from the upper terminal of battery 136 thru a conductor 228, signal 132, a conductor 230, a multiple plug connector 232, a conductor 234, leaf spring 212, contacts 204 and 206, leaf spring 208, a conductor 36, contact 166, contact 164, rod 158, bushing 160, wall 162 of housing 140, a binding post 238, a conductor 240, connector 232, a conductor 242, and ground connections 244 and 246 to the lower terminal of battery 136. As soon as the pilot moves the lever 224 from the lean position to the rich position in accordance with the indication of the signal 132, the energization of signal 132 is discontinued by the separation of contacts 204 and 206. This separation takes place by virtue of the movement of cam 226 into engagement with roller 210.

When the mixture control lever 224 is in its dotted line, or rich position, the signal 134 is energized whenever the rod 158 moves downward so as to move contact 164 into engagement with contact 168. This completes an energizing circuit for signal 134, which may be traced from the upper terminal of battery 136 thru signal 134, a conductor 248, connector 232, a conductor 250, leaf spring 222, contacts 214 and 216, leaf spring 218, a conductor 252, contact 168, contact 164, rod 158, bushing 160, wall 162 of casing 140, binding post 238, conductor 240, connector 232, conductor 242, and ground connections 244 and 246 to the lower terminal of battery 136. When the mixture control lever 224 is moved to its lean position in responsive to such a signal, the signal 134 is deenergized by the separation of contacts 214 and 216.

*Figure 4*

Figure 4 illustrates the relative effect of the rate of climb and the flow of combustion air on the control devices illustrated in Figures 2 and 3.

In Figure 4, the ordinates represent rates of climb expressed in feet per minute, and the abscissae represent air flow in pounds per hour. The heavy line in Figure 4 represents the various conditions of rate of climb and air flow wherein the switch contact 164 is a neutral position, engaging neither contact 166 nor contact 168. When the flight conditions are such that the ordinate representing the rate of climb intersects the abscissa corresponding to the air flow to the right or above the line, then the contact 164 engages contact 166. Similarly when the intersection is to the left or below the line, contact 164 engages contact 168.

The horizontal portion of the heavy line at the ordinate corresponding to a rate of climb of 100 feet per minute, indicates that regardless of the air flow, contact 164 will engage contact 166 when that rate of climb is exceeded. This particular rate of climb is chosen arbitrarily by way of example. Any particular rate of climb may be selected by properly choosing the characteristics of spring 146. If that rate of climb is exceeded, the bellows 144 by itself moves contact 164 into engagement with contact 166, and the diaphragm 174 can have no effect on the contacts except to increase the contact pressure with increasing air flow.

As the air flow increases above a predetermined value, shown by way of example as 2000 pounds per hour, it may aid the action of the bellows 144 in moving the contact 164 upwardly. In the example illustrated in Figure 4, an air flow of 3000 pounds will cause the contacts 164 and 166 to engage even though the rate of climb is zero.

In level flight the contact 164 engages contact 166 to give the lean signal whenever the air flow is less than 3000 pounds per hour. When diving (indicated by a negative rate of climb in Figure 4), the lean signal is given at greater air flows as the rate of dive increases. When climbing the rich signal may be given at air flows less than 3000 pounds per hour, depending on the rate of climb.

*Figure 5*

Figure 5 illustrates a modified form of the control device in Figure 3 wherein the bellows 144 of Figure 3, which was operated in accordance with the rate of climb, is replaced by a diaphragm 300 which is operated in accordance with a pressure differential indicative of the rate of flow of cooling air over the engine. In this connection it should be noted that the rate of climb of the aircraft may be said to be indicative of the rate of flow of cooling air over the engine. Figure 9 illustrates the mounting of the control device 382 of Figure 5 on the engine.

In Figure 5, the elements which correspond to similar elements in Figures 2 and 3 have been given the same reference characters. The engine is indicated schematically at 302. There is shown a cylinder 304 having cooling fins 306. The cooling air enters the front of a cowling 306 which surrounds the engine, and is directed past the fins 306 by a baffle plate 310. The quantity of cooling air may be regulated by a series of cowl flaps 312, which regulate the openings thru which the cooling air is released from the engine cowling. These flaps may be provided within a suitable manual or automatic control mechanism.

In Figure 5, the elements which correspond to similar elements in Figures 2 and 3 have been given the same reference characters. The diaphragm 300 separates a pair of chambers 314 and 316 in casing 140'. The diaphragm 300 is attached at its center to the switch operating rod 158. A spring 318 biases the diaphragm for movement to the right. The chamber 314 is connected thru a conduit 320 to the interior of the engine cowling at a point in front of the baffle plate 310. The chamber 316 is connected thru a conduit 322 to the interior of the engine cowling at a point in back of the baffle plate 310. The pressure drop across the baffle plate 310 is a measure of the quantity of air flowing past the fins 306, and hence is a measure of the amount of cooling effect produced by the flowing air. It is well known that in the case of a fluid flowing thru a fixed orifice in a closed conduit, the pressure drop across the orifice is a measure of the velocity of fluid flow thru the conduit. The engine cowling provides, in effect, a conduit for the cooling air. The baffles around the cylinders provide a fixed restriction in that conduit. Therefore, the pressure drop across the baffles is a measure of the rate of flow of cooling air past the engine. While it is true that the air temperature may vary considerably, nevertheless the engine temperature is so much higher than that of the air that the variations in the air temperature do not produce an appreciable percentage of change in temperature differential. Therefore, it may be stated that the pressure drop across the baffle plate is a measure of the cooling effect produced by the flowing air. It may be seen that as the pressure drop across the baffle increases, the diaphragm 300 is moved to the left, thereby moving switch contact 164 in the lean direction. On the other hand, when the pressure drop across the baffle plate decreases, the spring 318 moves diaphragm 300 and switch contact 164 in the rich direction.

As previously stated, the operation of the engine with a rich mixture causes it to run cooler than if a lean mixture is used. In the present arrangement, if the flow of cooling air is not sufficient to maintain the engine temperature in its normal range, then the switch contact 164 is operated to give an indication that the mixture control should be moved to its rich position. If the control mechanism illustrated in Figure 6 is used in place of the signal apparatus previously described, then the device shown in Figure 5 may be used to automatically control the fuel-to-air ratio, instead of operating a pair of signals.

In Figure 5, the diaphragm 174 is operated, as in the previous modifications, as a function of the rate of flow of combustion air to the engine. The position of diaphragm 174 may therefore be said to be responsive to a condition which varies with the power output of the engine. If the engine temperature is to remain in a selected normal range with varying power output, then the flow of cooling air should be modified to correspond to the power output. That is, with increasing power output, an increased cooling effect is necessary to maintain the engine temperature normal. If the flaps 312 are operated to maintain the temperature normal, then the control device of Figure 5 will allow the continued operation of the engine with a lean mixture even at high power outputs. If the flow of cooling air is insufficient, however, then the device will operate to indicate the need for a richer mixture.

Since the rod 158 is moved to the right by the diaphragm 174, which may be said to indicate the heat output of the engine, and to the left by the diaphragm 300, which may be said to indicate the cooling effect available, it may be seen that the position of the rod 158 may be taken as a measure of the net heating or cooling effect tending to vary the engine temperature at any given time. Therefore, the position of rod 158 may be said to anticipate changes in engine temperature which will result from present existing conditions, provided those conditions are not changed.

*Figure 6*

Figure 6 illustrates, somewhat diagrammatically, a control device 380 which may be used in conjunction with the devices of Figure 2 or 6 to automatically control the fuel-to-air ratio. If so used, the control device of Figure 6 would be substituted for the signals illustrated in Figures 1 and 3. Connections for the devices of Figures 5 and 6, when used together, are indicated in Figure 9.

There is shown in Figure 6 an electromagnetic motor device having an armature 340 and a pair of windings 342 and 344. The armature 340 is provided with extensions 346 and 348 at its opposite ends. The extension 348 is connected thru a pin and slot connection to an arm 350 fixed on a mixture control shaft which may be the shaft 108 of Figure 1. The arm 350 is shown in full lines in a position corresponding to the lean position of the shaft 108 in Figure 1. The dotted line position of arm 350 corresponds to the rich position of shaft 108 in Figure 1. A toggle mechanism 352 cooperates with the extension 346 of armature 340 to insure movement of the armature and its associated parts to one end or the other of its range of travel. The extension 346 also carries a switch operating projection 354. The projection 354 cooperates with two switches generally indicated at 356 and 358. These switches are illustrated as being of the push button type, self biased to closed position, and are actuated to open position upon engagement by the projection 354.

The winding 342 is arranged with respect to armature 340 so that when winding 342 is energized, the armature 340 is moved to the left, thereby operating arm 350 and mixture control shaft 108 to its rich position. On the other hand, winding 344, when energized, causes operation of armature 340 to the right, thereby carrying arm 350 and shaft 108 to the lean position illustrated in the drawing.

The energizing circuit for winding 342 may be traced from the upper terminal of a battery 360, thru a conductor 362, winding 342, a conductor 364, switch 356, conductor 230, and thence through contacts 166 and 164 to ground and thru ground connection 366 to the lower terminal of battery 360.

The energizing circuit for winding 344 may be traced from the upper terminal of battery 360 thru a conductor 368, winding 344, a conductor 370, switch 358, conductor 248, and thence thru contacts 168 and 164 to ground and thru ground connection 366 to the lower terminal of battery 360.

It is believed to be apparent that the control devices shown in Figures 2, 3 and 6 may be used to operate either signals as shown in Figures 1 and 3 or a mixture controlling device such as shown in Figure 6. Furthermore, audible or other sensible signals may be used in place of the visible signals illustrated.

While I have shown and described certain preferred embodiments of my invention, other modifications thereof will be readily apparent to those skilled in the art, and I therefore intend my invention to be limited only by the appended claims.

I claim as my invention:

1. Control apparatus for an aircraft engine comprising a control member movable between a first position indicative of the need for operation of said engine with a lean fuel to air ratio and a second position indicative of the need for operation of said engine with a rich fuel to air ratio, means responsive to the rate of climb of said aircraft for moving said member toward said second position as said rate of climb increases, and means responsive to the rate of flow of combustion air to said engine for modifying the action of said rate of climb responsive means when said rate of climb is in a predetermined range of values.

2. Control apparatus for a fluid-cooled internal combustion engine, comprising a control member movable between a first position indicative of the need for operation of said engine with a lean fuel to air ratio and a second position indicative of the need for operation of said engine with a rich fuel to air ratio, means responsive to a condition indicative of the rate of flow of cooling fluid for moving said member toward said second position as said rate of flow decreases, a second movable member, means for positioning said second member in accordance with the rate of flow of combustion air to said engine, and a one-way driving connection between said members so that said second member may apply to said first member a force acting toward the second position of said first member.

3. Control apparatus for an air-cooled internal combustion engine having cooling fins and a baffle structure to direct a flow of air past said fins, comprising a control member movable between a first position indicative of the need for operation of said engine with a lean fuel to air ratio and a second position indicative of the need for operation of said engine with a rich fuel to air ratio, and means responsive to the difference of air pressures on opposite sides of said baffle structure for moving said member toward said second position as said pressure difference decreases.

4. Control apparatus for an air-cooled internal combustion engine having cooling fins and a baffle structure to direct a flow of air past said fins, comprising a control member movable between a first position indicative of the need for operation of said engine with a lean fuel to air ratio and a second position indicative of the need for operation of said engine with a rich fuel to air ratio, means responsive to the difference of air pressures on opposite sides of said baffle structure for moving said member toward said second position as said pressure difference decreases, and control means operated by said member for controlling the ratio of fuel to air supplied to said engine.

5. Control apparatus for a fluid-cooled internal combustion engine, comprising a control member movable between a first position indicative of the need for operation of said engine with a lean fuel to air ratio and a second position indicative of the need for operation of said engine with a rich fuel to air ratio, and means responsive to the rate of flow of cooling fluid for moving said member toward said second position as said rate of flow decreases.

6. Control apparatus for an aircraft engine comprising a control member movable between a first position indicative of the need for operation of said engine with a lean fuel to air ratio and a second position indicative of the need for operation of said engine with a rich fuel to air ratio, means responsive to the rate of climb of said aircraft for moving said member toward said second position as said rate of climb increases, and means responsive to the rate of flow of combustion air to said engine for additionally moving said member toward said second position as said rate of flow increases.

7. Control apparatus for a fluid-cooled internal combustion engine, comprising a control member movable between a first position indicative of the need for operation of said engine with a lean fuel to air ratio and a second position indicative of the need for operation of said engine with a rich fuel to air ratio, means responsive to a condition indicative of the rate of flow of cooling fluid for moving said member toward said second position as said rate of flow decreases, and means responsive to the rate of flow of combustion air to said engine for additionally moving said member toward said second position as the rate of flow of combustion air increases.

8. Control apparatus for an air-cooled internal combustion engine having cooling fins and a baffle structure to direct a flow of air past said fins, comprising a control member movable between a first position indicative of the need for operation of said engine with a lean fuel to air ratio and a second position indicative of the need for operation of said engine with a rich fuel to air ratio, means responsive to the difference of air pressures on opposite sides of said baffle structure for moving said member toward said second position as said pressure difference decreases, a second movable member, means for positioning said second member in accordance with the rate of flow of combustion air to said engine, and a one-way driving connection between said members so that said second member may apply to said first member a force acting toward the second position of said first member when said rate of flow increases above a predetermined value.

9. Control apparatus for a fluid-cooled internal combustion engine, comprising a control member movable between a first position indicative of the need for operation of said engine with a lean fuel to air ratio and a second position indicative of the need for operation of said engine with a rich fuel to air ratio, first switch means associated with said member and operated to circuit-closing position by said member when said member is in said first position, second switch means associated with said member and operated to circuit-closing position by said member when said member is in said second position, means responsive to a condition indicative of the rate of flow of cooling fluid for moving said member toward said second position as said rate of flow decreases, means responsive to the rate of flow of combustion air to said engine for additionally moving said member toward said second position as the rate of flow of combustion air increases, a fuel-to-air ratio control device movable between a first position wherein said engine is operated with a lean fuel-to-air ratio and a second position wherein said engine is operated with a rich fuel-to-air ratio, third and fourth switch means biased to their circuit-closing positions and operated to their respective open positions when said control device is in its first and second positions, respectively, motor means for moving said device, a first electrical circuit including said first and third switch means in series for energizing said motor means to move said device to its first position, and a second electrical circuit including said second and fourth switch means in series for energizing said motor means to move said device to its second position.

10. Control apparatus for an internal combustion engine, comprising a pair of electrical circuits to be selectively closed in accordance with the need for operation of said engine with a richer or leaner mixture, a pair of stationary switch contacts respectively connected in said circuits, a movable contact selectively engageable with said stationary contacts, a first element movable in response to a condition affecting the rate of flow of cooling fluid for said engine, a rigid driving connection between said element and said movable contact, a second element movable in response to the rate of flow of combustion air to said engine, and a one-way driving connection between said second element and said movable contact so that said second element is selectively effective or ineffective to apply a positioning force to said movable contact depending upon the rate of flow of combustion air.

11. Control apparatus for an aircraft engine comprising a pair of electrical circuits to be selectively closed in accordance with the need for operation of said engine with a richer or leaner mixture, a pair of stationary switch contacts respectively connected in said circuits, a movable contact selectively engageable with said stationary contacts, a first element movable in response to the rate of climb of said aircraft, a rigid driving connection between said element and said movable contact, a second element movable in response to the rate of flow of combustion air to said engine, and a one-way driving connection between said second element and said movable contact so that said second element is selectively effective or ineffective to apply a positioning force to said movable contact depending upon the rate of flow of combustion air.

12. Control apparatus for an internal combustion engine, comprising a pair of electrical circuits to be selectively closed in accordance with the need for operation of said engine with a richer or leaner mixture, a pair of stationary switch contacts respectively connected in said circuits, a movable contact selectively engageable with said stationary contacts, a first element movable in response to the rate of flow of cooling fluid for said engine, a rigid driving connection between said element and said movable contact, a second element movable in response to the rate of flow of combustion air to said engine, and a one-way driving connection between said second element and said movable contact so that said second element is selectively effective or ineffective to apply a positioning force to said movable contact depending upon the rate of flow of combustion air.

13. Control apparatus, comprising a stationary switch contact, a movable switch contact, a pair of expansible chambers separated by a movable wall, a rod attached to said movable wall and connecting said contact to said movable contact, a second pair of expansible chambers separated by a second movable wall, a sleeve carried by said second wall and surrounding said rod, a shoulder on said rod adjacent one side of said sleeve, said sleeve and shoulder forming a one-way driving connection between said second movable wall and said rod, so that said second movable wall is selectively effective or ineffective to apply a positioning force to said movable contact, depending upon the position of said second wall.

LEIGHTON LEE, II.

REFERENCES CITED

The following references are of record in the file of this patent:

UNITED STATES PATENTS

| Number | Name | Date |
|---|---|---|
| 1,225,437 | Hammond | May 8, 1917 |
| 1,433,586 | Woodard | October 31, 1922 |
| 2,112,253 | Smith | March 29, 1938 |
| 2,148,471 | Jones | February 28, 1939 |
| 2,291,610 | Crane | August 4, 1942 |
| 2,081,762 | Nissen | May 25, 1937 |
| 1,838,408 | King | August 2, 1932 |
| 1,603,005 | Flam | October 12, 1926 |
| 2,318,734 | Baak | May 11, 1943 |
| 2,377,503 | Kronmiller | June 5, 1945 |

FOREIGN PATENTS

| Number | Country | Date |
|---|---|---|
| 523,895 | England | July 25, 1940 |